(12) United States Patent
Kamdar et al.

(10) Patent No.: US 9,008,078 B2
(45) Date of Patent: Apr. 14, 2015

(54) ENHANCED EMERGENCY SERVICES FOR FIXED WIRELESS CUSTOMER PREMISES EQUIPMENT

(75) Inventors: Kamlesh S. Kamdar, Dublin, CA (US); Sergio Aguirre, Southlake, TX (US); Raafat Edward Kamel, Little Falls, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 315 days.

(21) Appl. No.: 13/170,421

(22) Filed: Jun. 28, 2011

(65) Prior Publication Data
US 2013/0003719 A1 Jan. 3, 2013

(51) Int. Cl.
*H04W 4/00* (2009.01)
*H04L 29/06* (2006.01)
*H04M 3/51* (2006.01)
*H04M 7/00* (2006.01)
*H04W 4/22* (2009.01)

(52) U.S. Cl.
CPC ............ *H04W 4/22* (2013.01); *H04L 65/1036* (2013.01); *H04L 65/1069* (2013.01); *H04M 3/5116* (2013.01); *H04M 7/0069* (2013.01); *H04M 2203/2016* (2013.01); *H04M 2207/185* (2013.01); *H04M 2207/206* (2013.01)

(58) Field of Classification Search
USPC .......................................................... 370/352
See application file for complete search history.

(56) References Cited

U.S. PATENT DOCUMENTS

| | | | |
|---|---|---|---|
| 6,795,449 B1 * | 9/2004 | Kim .............................. 370/443 |
| 7,065,203 B1 * | 6/2006 | Huart et al. .............. 379/266.06 |
| 7,457,287 B1 * | 11/2008 | Shaffer et al. ................. 370/389 |
| 2005/0179607 A1 | 8/2005 | Gorsuch et al. |
| 2005/0213565 A1 * | 9/2005 | Barclay et al. ................ 370/352 |
| 2005/0276409 A1 * | 12/2005 | Goldman et al. ........ 379/220.01 |
| 2007/0173303 A1 | 7/2007 | Viorel et al. |
| 2007/0280445 A1 * | 12/2007 | Shkedi ....................... 379/93.23 |
| 2009/0214001 A1 * | 8/2009 | Schwartz ........................ 379/45 |
| 2010/0311321 A1 | 12/2010 | Norin |
| 2010/0313232 A1 | 12/2010 | Norin |
| 2012/0164975 A1 * | 6/2012 | Dodeja et al. ................. 455/410 |

* cited by examiner

*Primary Examiner* — Sulaiman Nooristany

(57) ABSTRACT

A gateway device, provided in a customer premises, receives a call from a user device, and detects dialed information associated with the call. The gateway device identifies the call as an emergency call based on the dialed information, and terminates all other calls communicated by the gateway device except for the emergency call. The gateway device notifies an outdoor broadband unit, associated with the customer premises, about the emergency call.

18 Claims, 9 Drawing Sheets

ENHANCED EMERGENCY SERVICES FOR FIXED WIRELESS CUSTOMER PREMISES EQUIPMENT

BACKGROUND

Bundled media services, such as combination packages of television, telephone, and broadband Internet services, have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless networks for some of these services (e.g., broadband access). However, previous generations of fixed wireless networks have generally been unsuccessful. Expensive network equipment and customer premises equipment (CPE), high CPE installation costs, use of proprietary technology, and low data rates are among some of the reasons that these fixed wireless networks remained unpopular. As wireless network data rates improve using fourth generation (4G) technologies, such as Long-Term Evolution (LTE), such network data rates have made it easier to implement fixed wireless networks.

It is anticipated that fixed wireless users will have significantly different characteristics compared to mobile wireless users. For example, fixed wireless CPE may have several active users using a single common LTE communication point. Multiple user devices may connect to the single LTE communication point, resulting in significantly higher data usage rates. Such user devices may include laptop computers, personal computers, WiFi (e.g., IEEE 802.11) access points, other WiFi appliances, gaming systems, security monitoring devices, multiple voice over Internet protocol (VoIP) devices, etc.

However, with several active users and multiple user devices, the fixed wireless CPE will not provide a highest priority to enhanced emergency calls (or "E911" calls) since there is a limited implementation of emergency services inside a customer premises. For example, multiple voice calls, automatic data download (e.g., video on demand), and/or heavy usage by other applications in the fixed wireless CPE may impede a priority of an E911 call and may even delay the E911 call.

DETAILED DESCRIPTION OF PREFERRED EMBODIMENTS

Figure 1:
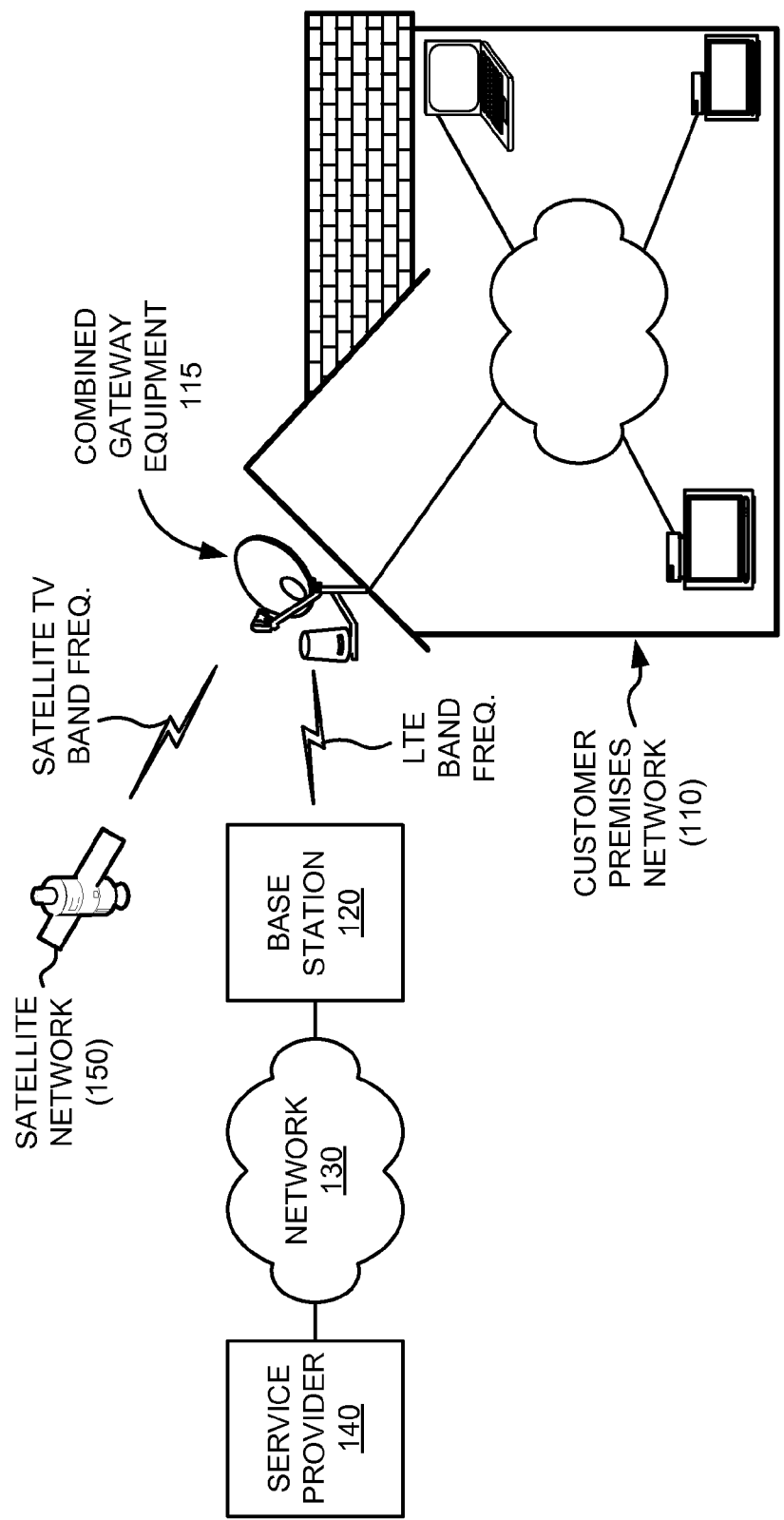
FIG. 1 is a diagram of an example environment in which systems and/or methods described herein may be implemented.

The following detailed description refers to the accompanying drawings. The same reference numbers in different drawings may identify the same or similar elements.

Systems and/or methods described herein may provide enhanced emergency services in fixed wireless customer premises equipment (CPE) that includes combined gateway equipment and a VoIP gateway. The combined gateway equipment may include satellite and radio frequency (RF) antennas that are installed at a customer premises. The RF antenna may be provided in an outdoor broadband unit, of the combined gateway equipment, that includes a LTE module capable of communicating with a wireless network. The outdoor broadband unit may also include a broadband home router (BHR) capable of communicating with a customer premises network.

The RF antenna may include several antenna elements that can be used individually or combined to synthesize several overlapping antenna beams spanning three-hundred and sixty (360) degrees in azimuth. In one implementation, the RF antenna may include a wideband multiple beam antenna, with partially overlapping antenna beams, spanning three-hundred and sixty (360) degrees in azimuth (x-y plane). For example, the RF antenna may include between four and eight beams to achieve desirable antenna gains and reduction of interference. Additionally, or alternatively, the RF antenna may employ two polarizations per beam for a 2×2 downlink multiple-input and multiple-output (MIMO) operation. In another implementation, the RF antenna may include a fixed dually-polarized directional antenna. As a directional antenna, the RF antenna may use polarizations matched to the polarizations of a particular base station. For example, a polarization of the RF antenna may match a polarization of a serving enhanced Node B (eNB) or base station. Antenna pointing for the directional antenna may be conducted, for example, during installation of the outdoor broadband unit.

The VoIP gateway may include a device that may provide connectivity between equipment within the customer premises and between the customer premises equipment and an external network. In one example, the VoIP gateway may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). The VoIP gateway may also convert telephony traffic into Internet protocol (IP) traffic for transmission over a network. In one example, the VoIP gateway may convert incoming Public Switched Telephone Network (PSTN)/telephone lines to VoIP so that calls may be received and placed on a regular telephony network. In another example, the VoIP gateway may connect a traditional telephone system to an IP network so that calls can be received and placed via a VoIP service provider.

In one example implementation, the VoIP gateway may receive a call from a user device associated with the customer premises, and may detect dialed information associated with the call. The VoIP gateway may identify the call as an emergency call based on the dialed information (e.g., based on dialed digits, such as 9-1-1), and may terminate all other data communications, include other voice calls, except for the emergency call. The VoIP gateway may notify the LTE module, of the outdoor broadband unit, about the emergency call, and may provide the emergency call to the LTE module. The LTE module may route the emergency call to an emergency call server, and the emergency call server may route the emergency call to a public safety answering point (PSAP). The PSAP may be responsible for answering emergency calls, and may communicate with emergency personnel (e.g., police, fire, and/or ambulance services) to provide information associated with emergency calls.

FIG. 1 is a diagram of an example environment 100 in which systems and/or methods described herein may be implemented. As illustrated, environment 100 may include a customer premises network 110, combined gateway equipment 115, a base station 120, a network 130, a service provider 140, and a satellite network 150. A single customer premises network 110, base station 120, network 130, service provider 140, and satellite network 150 have been illustrated in FIG. 1 for simplicity. In practice, there may be more customer premises networks 110, combined gateways 115, base stations 120, networks 130, service providers 140, and/or satellite networks 150.

Customer premises network 110 may include one or more devices connected to each other, base station 120, and/or satellite network 150. Devices in customer premises network 110 may include, for example, set-top boxes (STBs), televisions, computers, and home networking equipment (e.g., routers, cables, splitters, local gateways, etc.). Devices within customer premises network 110 may be connected via wired (e.g., coaxial cable, Telecommunications Industry Association category 5 ("cat 5") cable, etc.) or wireless connections (e.g., using network devices such as those available under the IEEE 802.11 wireless LAN standards) to form a LAN. In the example shown in FIG. 1, customer premises network 110 may connect to base station 120 through a two-way wireless connection, such as using a LTE band frequency, and may connect to satellite network 150 through a one-way (e.g., downlink) wireless connection, such as using a satellite television (TV) band frequency. The two-way wireless connection and the one-way wireless connection may be implemented using combined gateway equipment 115.

Combined gateway equipment 115, which is described in more detail below, may generally include mechanisms for communicating with satellite network 150 (to provide satellite-based communications) and for communicating with base station 120 (to provide RF-based communications). Combined gateway equipment 115 may connect, such as via a coaxial connection, to devices inside of the customer premises, such as the devices connected to customer premises network 110.

Base station 120 may include one or more computation and/or communication devices that receive voice and/or data (e.g., video content) from service provider 140 (e.g., via network 130) and transmit that voice and/or data to customer premises network 110. Base station 120 may also include one or more devices that receive voice and/or data from customer premises network 110 and transmit that voice and/or data to service provider 140 (e.g., via network 130). In one example implementation, base station 120 may utilize LTE standards operating in a 700 megahertz (MHz) frequency band.

Network 130 may include a local area network (LAN), a wide area network (WAN), a metropolitan area network (MAN), a telephone network, such as the PSTN, an intranet, the Internet, an optical fiber (or fiber optic)-based network, a cable television network, a satellite television network, or a combination of networks. In one example implementation, network 130 may include core network equipment, such as a packet data network (PDN) gateway (PGW), a serving gateway (SGW), a mobility management entity (MME), etc.

Service provider 140 may include one or more server devices, or other types of computation or communication devices, that gather, process, search, and/or provide information in a manner described herein. In one implementation, service provider 140 may include a web server, a computer system, an application, a cable head-end, and/or a broadcasting device capable of providing IP-based content and/or services to devices in customer premises network 110.

Satellite network 150 may provide multimedia content from, for example, a direct broadcast satellite (DBS) service provider (not shown). Satellite network 150 may provide a downlink signal over a designated satellite TV band frequency, typically in the range of 950 MHz to 2150 MHz. The downlink signal may be received using a satellite antenna/receiver system at the customer premises to present satellite TV content to a user.

In implementations described herein, customer premises network 110 may combine LTE functionality with satellite TV service. Using combined gateway equipment 115, which includes an outdoor LTE module, both broadband (over LTE) service (e.g., via base station 120) and satellite TV service (e.g., via satellite network 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols, such as, for example, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
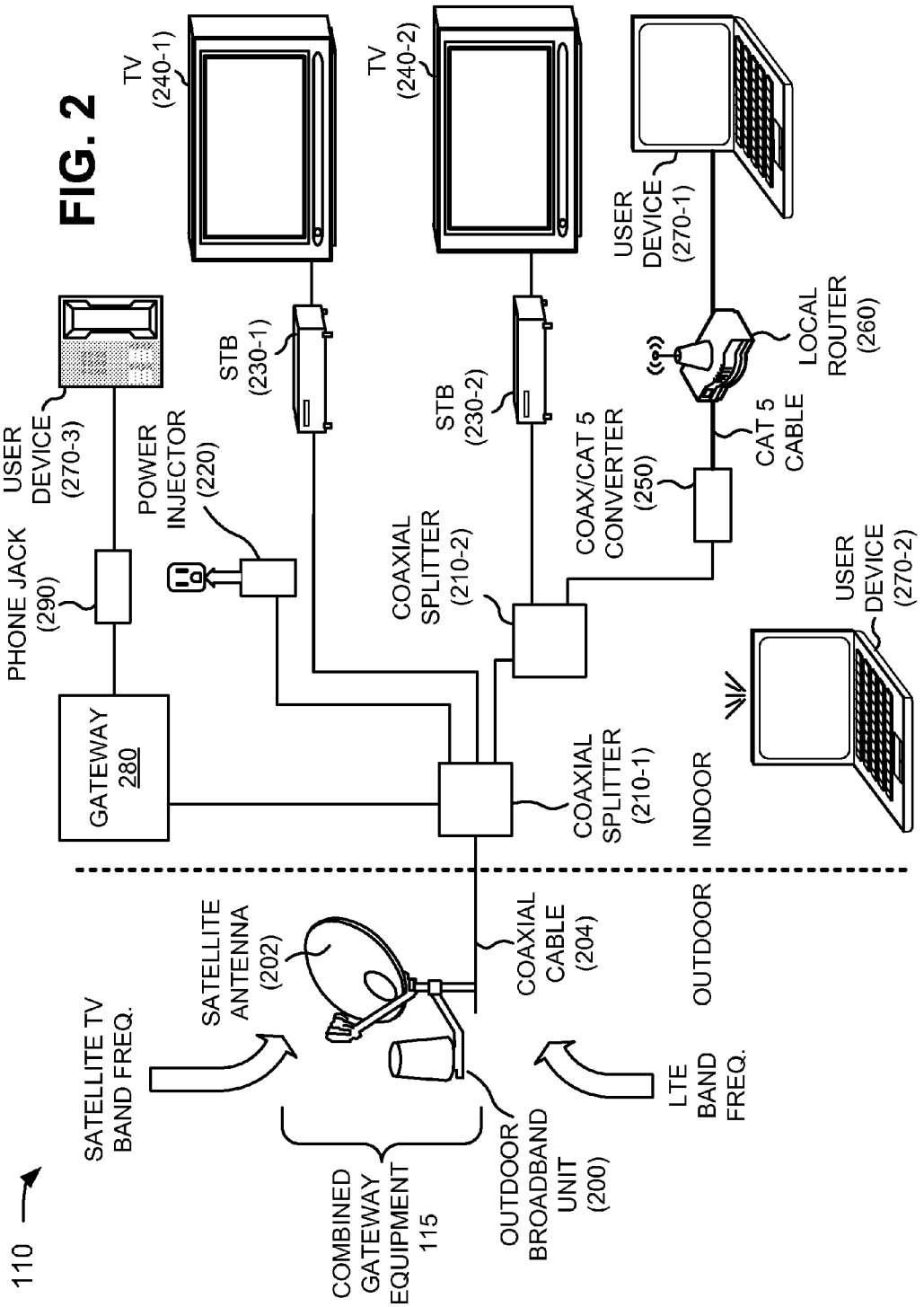
FIG. 2 is a diagram of an example customer premises network illustrated in FIG. 1 according to an implementation described herein.

FIG. 2 is a diagram of an example customer premises network 110 according to an implementation described herein. As illustrated, combined gateway equipment 115 of customer premises network 110 may include an outdoor broadband unit 200 and a satellite antenna 202. A coaxial cable 204 may connect combined gateway equipment 115 to the indoor portion of customer premises network 110. Customer premises network 110 may further include coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, user devices 270-1, 270-2, and 270-3 (referred to herein collectively as "user devices 270" or generically as "user device 270"), a gateway 280, and a phone jack 290. One outdoor broadband unit 200, two coaxial splitters 210, one power injector 220, two STBs 230, two televisions 240, one coax/Cat 5 converter 250, one local router 260, three user devices 270, one gateway 280, and one phone jack 290 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, user devices 270, gateways 280, and/or phone jacks 290.

Outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with base station 120) and IP protocols (e.g., associated with user devices 270). Outdoor broadband unit 200 may be physically deployed with satellite antenna 202 (e.g., on a roof or a side wall of a house associated with customer premises network 110) as part of combined gateway 115. For example, outdoor broadband unit 200 may utilize a pre-existing or a new satellite TV installation in a way that both broadband (over LTE) service and satellite TV are brought indoors (e.g., inside the customer premises) over a coaxial cable 204. Outdoor broadband unit 200 is discussed further in connection with, for example, FIGS. 3 and 5.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter.

Power injector 220 may include a mechanism for injecting direct current (DC) power into a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, a computing device, etc., not shown in FIG. 2) connected to television 240. Coax-to-Cat 5 converter 250 may include a conventional device to convert incoming signals from coaxial cables to outgoing signals on Cat 5 cables. In one example, STB 230 and coax-to-Cat5 converter 250 may facilitate allocating logical channels using different frequency blocks for viewer-selected television programming and broadband signals.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a Universal Serial Bus (USB) Ethernet Router that is capable of meeting LTE quality of service (QoS) standards.

User device 270 may include any device that is capable of communicating with customer premises network 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a tablet computer, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a gaming system, etc. In still another example, user device 270 (e.g., user device 270-3) may include a fixed communication device, such as a telephone, connected to a telephone network (e.g., the PSTN) via phone jack 290.

Gateway 280 may include a device that may provide connectivity between equipment within the customer premises (e.g., user devices 270) and between the customer premises equipment and an external network (e.g., network 130). In one implementation, gateway 280 may include a VoIP gateway that employs one or more short-range wireless communication protocols for a WPAN and/or a WLAN, such as, for example, IEEE 802.15 (e.g., Bluetooth) and IEEE 802.11 (e.g., Wi-Fi). In other implementations, different short-range wireless protocols and/or frequencies may be used. Gateway 280 may also include one or more wired (e.g., Ethernet) connections.

Gateway 280 may convert telephony traffic into IP traffic for transmission over a network (e.g., network 130). In one example, gateway 280 may convert incoming PSTN/telephone lines (e.g., connected to phone jack 290) to VoIP so that calls may be received and placed on a regular telephony network. In another example, gateway 280 may connect a traditional telephone system (e.g., via phone jack 290) to an IP network so that calls can be received and placed via a VoIP service provider (e.g., service provider 140).

Phone jack 290 may include a surface-mounted connector with a female electrical contact or socket. In one example, phone jack 290 may include a "registered jack," such as a RJ11, a RJ45, and similar connectors; a modular jack, such as an Ethernet jack, used in modern telephone systems and computer network interfaces; etc.

Although FIG. 2 shows example components of customer premises network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

Figure 3:
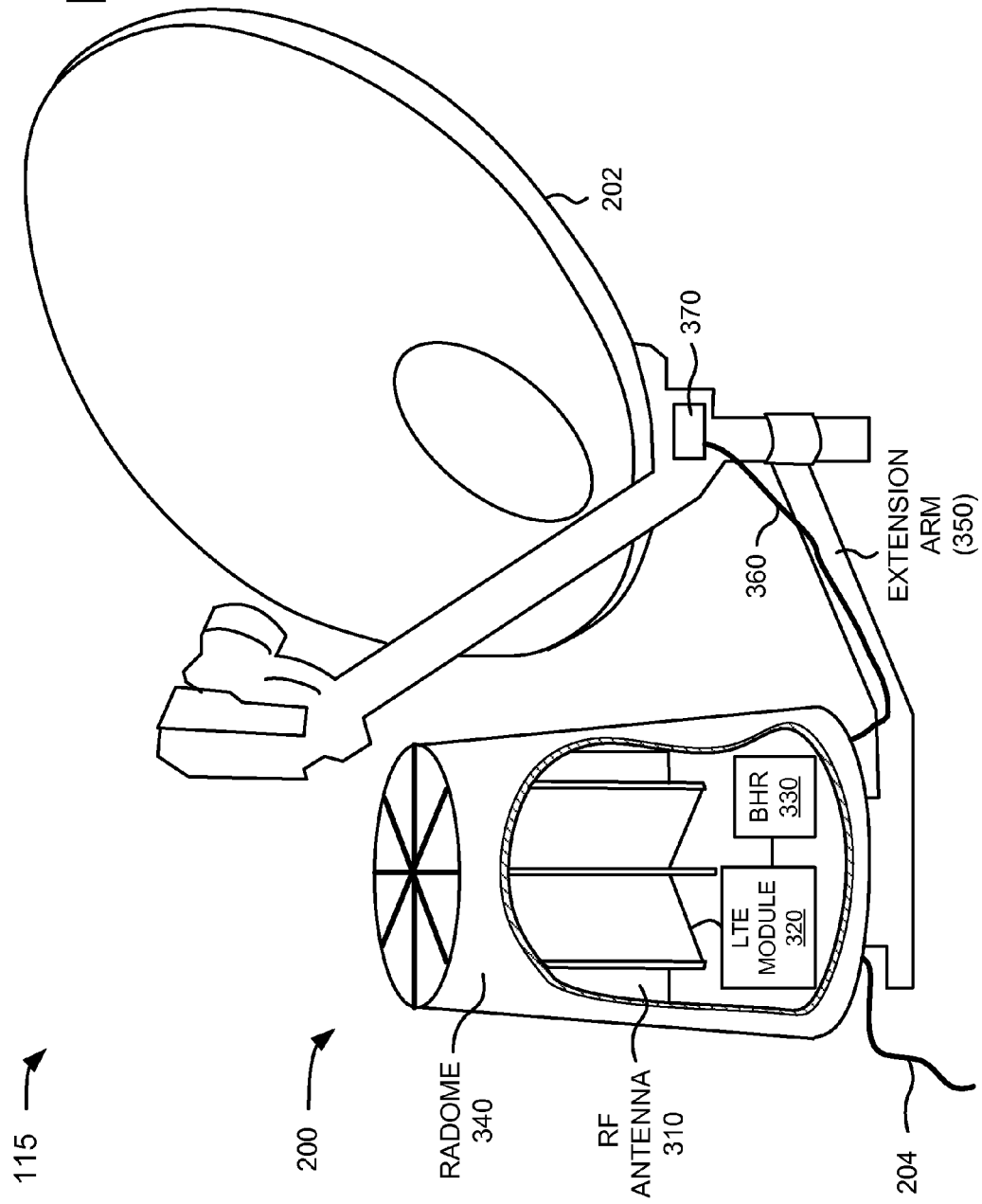
FIG. 3 is a diagram of example components of combined gateway equipment depicted in FIG. 2.

FIG. 3 is a diagram of example components of combined gateway equipment 115 of customer premises network 110. As illustrated, combined gateway equipment 115 may include outdoor broadband unit 200 and satellite antenna 202. Outdoor broadband unit 200 and satellite antenna 202 may include features described above in connection with, for example, FIGS. 1 and 2. Outdoor broadband unit 200 may include a radio frequency (RF) antenna 310, a LTE module 320, and a broadband home router (BHR) 330, all housed in a radome 340. In one implementation, as shown in FIG. 3, outdoor broadband unit 200 may be mounted on an extension arm 350 connected to a structure (e.g., an arm or a pole) supporting satellite antenna 202.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station (e.g., base station 120) connected to a network (e.g., network 130) to send and/or receive signals from user devices 270. In implementations herein, RF antenna 310 may be enclosed by radome 340, integrated with radome 340, or external to radome 340. While one RF antenna 310 is shown in FIG. 3, outdoor broadband unit 200 may include more than one antenna in other implementations.

In one implementation, RF antenna 310 may include a wideband multiple beam antenna, with partially overlapping antenna beams, spanning three-hundred and sixty (360) degrees in azimuth (x-y plane). For example, antenna 310 may include between four and eight beams to achieve desirable antenna gains and reduction of interference. Additionally, or alternatively, RF antenna 310 may employ two polarizations per beam for a 2×2 downlink multiple-input and multiple-output (MIMO) operation. In another example, RF antenna 310 may employ slant ±45° polarization or vertical/horizontal polarization.

In another implementation, RF antenna 310 may include a fixed dually-polarized directional antenna. As a directional antenna, RF antenna 310 may use polarizations matched to the polarizations of a particular base station (e.g., base station 120). For example, a polarization of RF antenna 310 may match a polarization of a serving enhanced Node B (eNB) or base station (e.g., base station 120). Antenna pointing for the directional antenna may be conducted, for example, during installation of outdoor broadband unit 200.

LTE module 320 may include a device (e.g., a modem) with communication capability via an air interface. For example, LTE module 320 may receive broadband signals and/or voice over Internet protocol (VoIP) signals from base station 120 (e.g., via RF antenna 310) and may transmit broadband signals and/or VoIP signals to base station 120 (e.g., via RF antenna 310). LTE module 320 may employ frequency division duplex (FDD) and/or time division duplex (TDD) techniques to facilitate downlink and uplink transmissions. In one implementation, LTE module 320 may include a beam selection mechanism that selects the best antenna beam, from RF antenna 310, and/or a serving cell according to a certain optimization criteria. Beam and/or serving cell selection may be performed, for example, during initial installation and/or regular maintenance of outdoor broadband unit 200. Additionally, or alternatively, LTE module 320 may select any of the RF antenna 310 beams and/or serving cell, based on real-time measurements, during normal operation.

BHR 330 may include a device for buffering and forwarding data packets toward destinations. For example, BHR 330 may receive data packets from base station 120 (e.g., via LTE module 320) and may forward the data packets toward user devices 270. In addition, BHR 330 may receive data packets from user devices 270 (e.g., via local router 260) and may forward the data packets toward recipient devices (e.g., service provider 140) via network 130.

In one example implementation, BHR 330 may be associated with a coaxial network controller (not shown) that provides an interface for Ethernet over coaxial signals, such as signals transmitted over coaxial cable 204 and into customer premises network 110. The coaxial network controller may act as a bridge device to receive signals from LTE module 320 via a wired USB connection and to convert the signals to an Ethernet over coax signal. The Ethernet over coax signal may be assigned a logical channel (e.g., according to SWiM guidelines) and may be combined with coaxial input from satellite antenna 202. In one implementation, the output from coaxial network controller may be inserted in a Mid-RF MoCA channel that is separate from the 950 MHz to 2150 MHz range of a typical satellite TV system.

Radome 340 (shown with a cut-away view to reveal LTE module 320 and BHR 330) may provide a weatherproof enclosure to protect RF antenna 310, LTE module 320, BHR 330, and/or other components of outdoor broadband unit 200. Generally, radome 340 may include any RF transparent or substantially RF transparent structure (e.g., a cover) that protects components in an outdoor environment.

As further shown in FIG. 3, a communication cable 360 (e.g., a coaxial cable) may connect outdoor broadband unit 200 to an interface component 370 of satellite antenna 202 that receives transmissions received by satellite antenna 202. The transmissions received by satellite antenna 202 may be provided to outdoor broadband unit 200 via communication cable 360 and interface component 370. Outdoor broadband unit 200 may receive the satellite transmissions and may receive RF signals via RF antenna 310. Outdoor broadband unit 200 may utilize a communication cable (e.g., coaxial cable 204) to provide the received satellite transmissions and the received RF signals to the indoor portion of customer premises network 110.

Combined gateway equipment 115 may be integrated with the SWiM environment associated with satellite antenna 202 to provide both TV service and broadband wireless service. With this architecture, combined gateway equipment 115 may require only one coax line leading from outdoor broadband unit 200/satellite antenna 202. This single coaxial line (e.g., coax cable 204) may feed the in-home coaxial installation to deliver satellite TV service and LTE service to corresponding STBs 230 and user devices 270 (e.g., as shown in FIG. 2). Components of outdoor broadband unit 200, such as RF antenna 310, LTE module 320, and BHR 330, may be powered using coax cable 204.

Although FIG. 3 shows example components of combined gateway equipment 115, in other implementations, combined gateway equipment 115 may contain fewer components, different components, differently arranged components, and/or additional components than depicted in FIG. 3. Alternatively, or additionally, one or more components of combined gateway equipment 115 may perform one or more other tasks described as being performed by one or more other components of combined gateway equipment 115. In one alternative implementation, one or more functions of combined gateway equipment 115 may be moved to another location, such as internal to the customer premises. For example, a bridge may be installed in combined gateway equipment 115 instead of BHR 330. The bridge may function to combine coaxial input from satellite antenna 202 with the output from LTE module 320 into a single coax line, which may be forwarded to a broadband router that is installed inside the customer premises.

Figure 4:
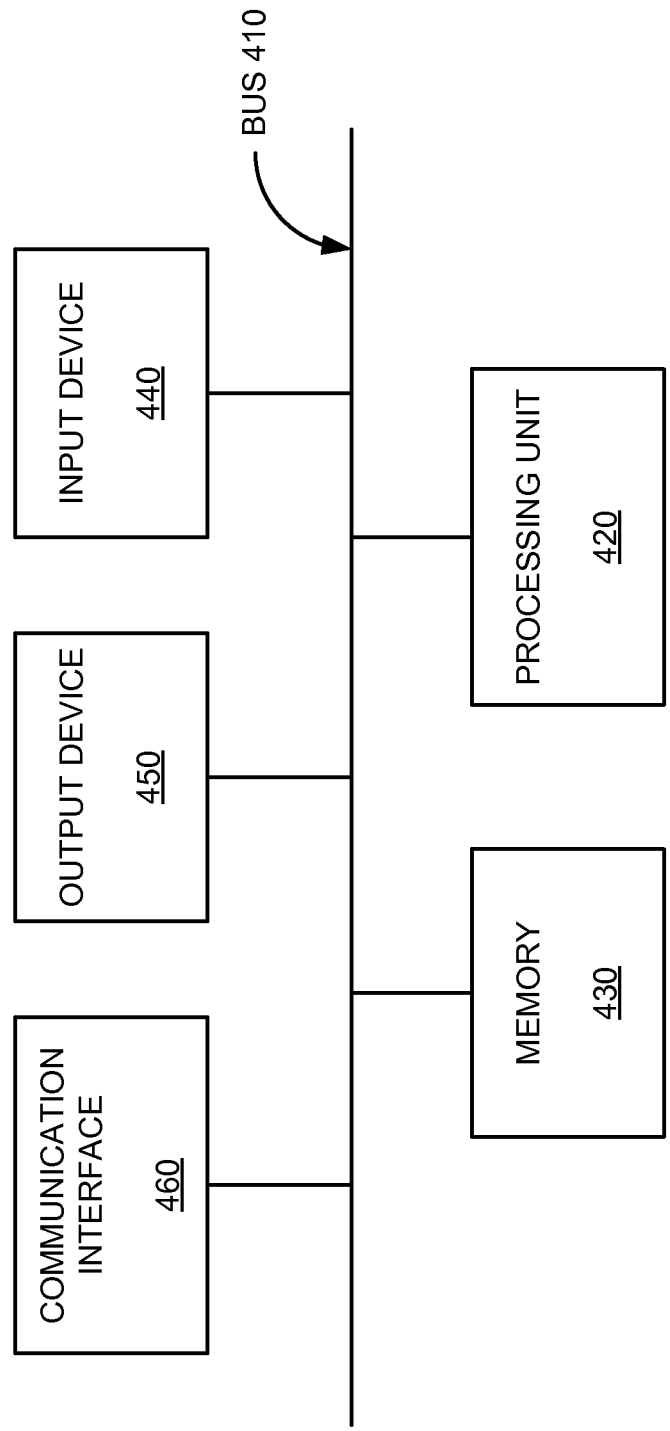
FIG. 4 is a diagram of example components of a device that may correspond to one of the devices of FIG. 1 or 2.

FIG. 4 is a diagram of example components of a device 400 that may correspond to one of the devices of environment 100 and/or customer premises network 110 (e.g., LTE module 320 and/or BHR 330). In one implementation, the devices of environment 100 and/or customer premises network 110 may include one or more devices 400. As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of environment 100 and/or customer premises network 110.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

Figure 5:
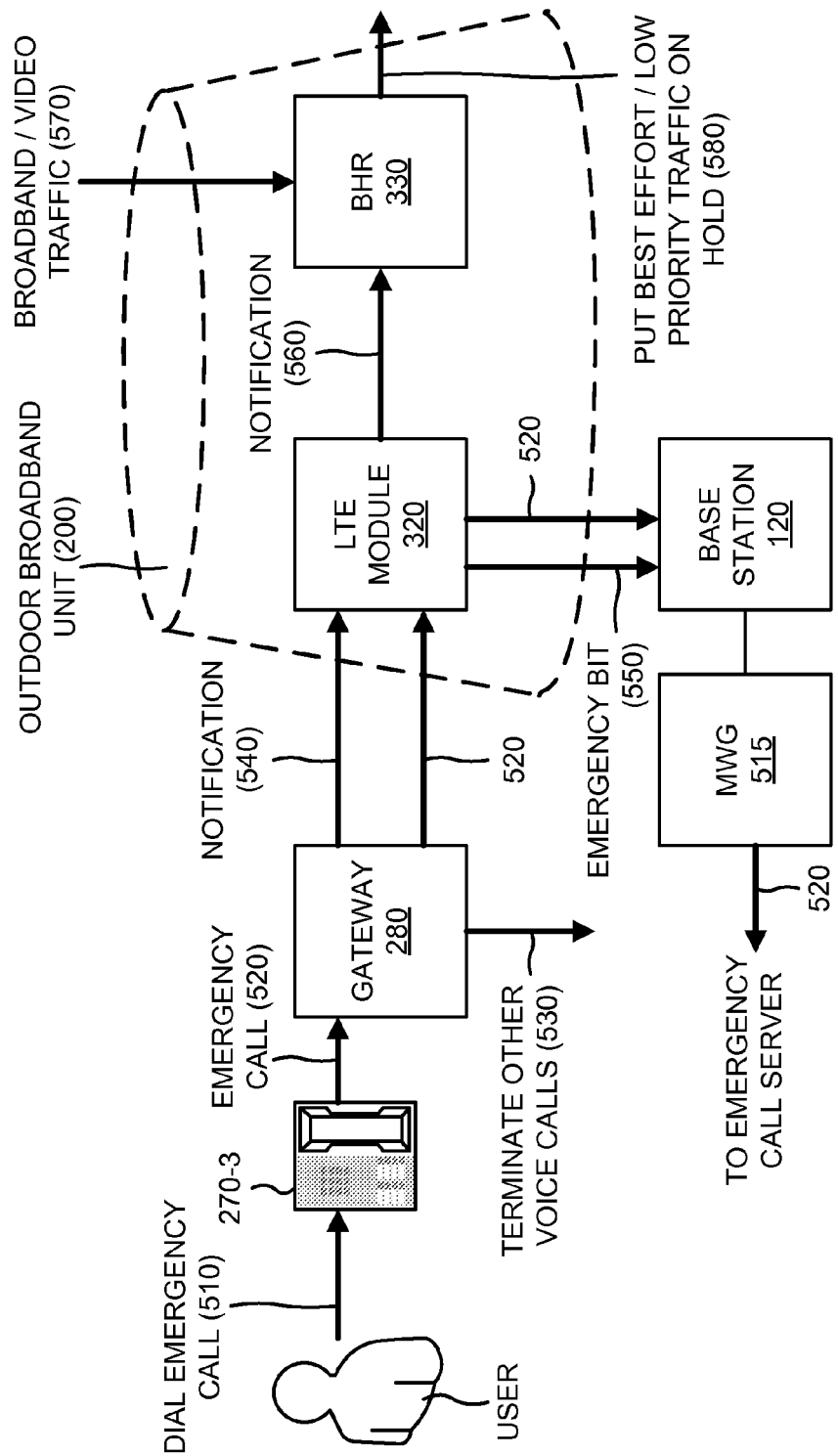
FIG. 5 is a diagram of example operations capable of being performed by an example portion of the environment illustrated in FIG. 1.

FIG. 5 is a diagram of example operations capable of being performed by an example portion 500 of environment 100. As shown, environment portion 500 may include base station 120, outdoor broadband unit 200, user device 270-3, gateway 280, LTE module 320, and BHR 330. Base station 120, outdoor broadband unit 200, user device 270-3, gateway 280, LTE module 320, and BHR 330 may include the features described above in connection with one or more of, for example, FIGS. 1-4.

As further shown in FIG. 5, a user may utilize user device 270-3 to dial digits for an emergency call, as indicated by reference number 510. In one example, the dialed digits may include the digits "9-1-1," the digits "N-1-1" for various other services (e.g., "3-1-1" for non-emergency police), the digits "1-1-2," etc. User device 270-3 may receive the dialed digits, may generate an emergency call 520 based on the dialed digits, and may provide emergency call 520 to gateway 280.

Gateway 280 may receive emergency call 520 from user device 270-3, and may detect dialed information (e.g., the dialed digits) associated with emergency call 520. Based on the dialed digits of emergency call 520, gateway 280 may identify call 520 as an emergency call and may terminate any other voice calls at customer premises network 110 except for emergency call 520, as indicated by reference number 530. Since emergency call 520 originated in customer premises network 110, gateway 280 may provide, to LTE module 320, a notification 540 about emergency call 520, and may provide emergency call 520 to LTE module 320. Alternatively, gateway 280 may treat call 520 as a voice call (i.e., a non-emergency call) and there may be no knowledge of the emergency nature of call 520 until call 520 is received by base station 120.

LTE module 320 may receive emergency call 520 and notification 540 from gateway 280, and may activate a notification bit (e.g., an emergency bit 550) of emergency call 520 based on notification 540. LTE module 320 may provide emergency call 520 and emergency bit 550 to a radio network (e.g., to base station 120). Emergency bit 550 may inform base station 120 about the urgent or emergency nature of emergency call 520, may instruct base station 120 to bypass authentication, billing, etc. associated with emergency call 520, and may instruct base station 120 to forward emergency call 520 to an emergency call server (not shown). Based on emergency bit 550, base station 120 may route emergency call 520 to the emergency call server, via a mobile wireless gateway (MWG) 515, and the emergency call server may route the emergency call to a PSAP. MWG 515 may include a wireless network device, such as a wireless router, connected to base station 120. The PSAP may be responsible for answering emergency call 520, and may communicate with emergency personnel (e.g., police, fire, and/or ambulance services) to provide information associated with emergency call 520.

LTE module 320 may provide, to BHR 330, a notification 560 about the emergency nature of emergency call 520. In one example implementation, LTE module 320 may provide notification 560 to BHR 330 prior to or at the same time that LTE module 320 activates emergency bit 550. BHR 330 may receive notification 560 and may receive broadband and/or video traffic 570 from devices in customer premises network 110. Based on notification 560, static and/or dynamic provisioning, and/or load, BHR 330 may cease all communications with customer premises network 110 other than a highest priority voice call (e.g., emergency call 520). For example, BHR 330 may stop transmitting or receiving broadband and/or video traffic 570. In one example implementation, BHR 330 may put best effort traffic and/or low priority traffic on hold while emergency call 520 is handled, as indicated by reference number 580.

Although FIG. 5 shows example components of environment portion 500, in other implementations, environment portion 500 may contain fewer components, different components, differently arranged components, or additional components than depicted in FIG. 5. Alternatively, or additionally, one or more components of environment portion 500 may perform one or more other tasks described as being performed by one or more other components of environment portion 500.

Figure 6:
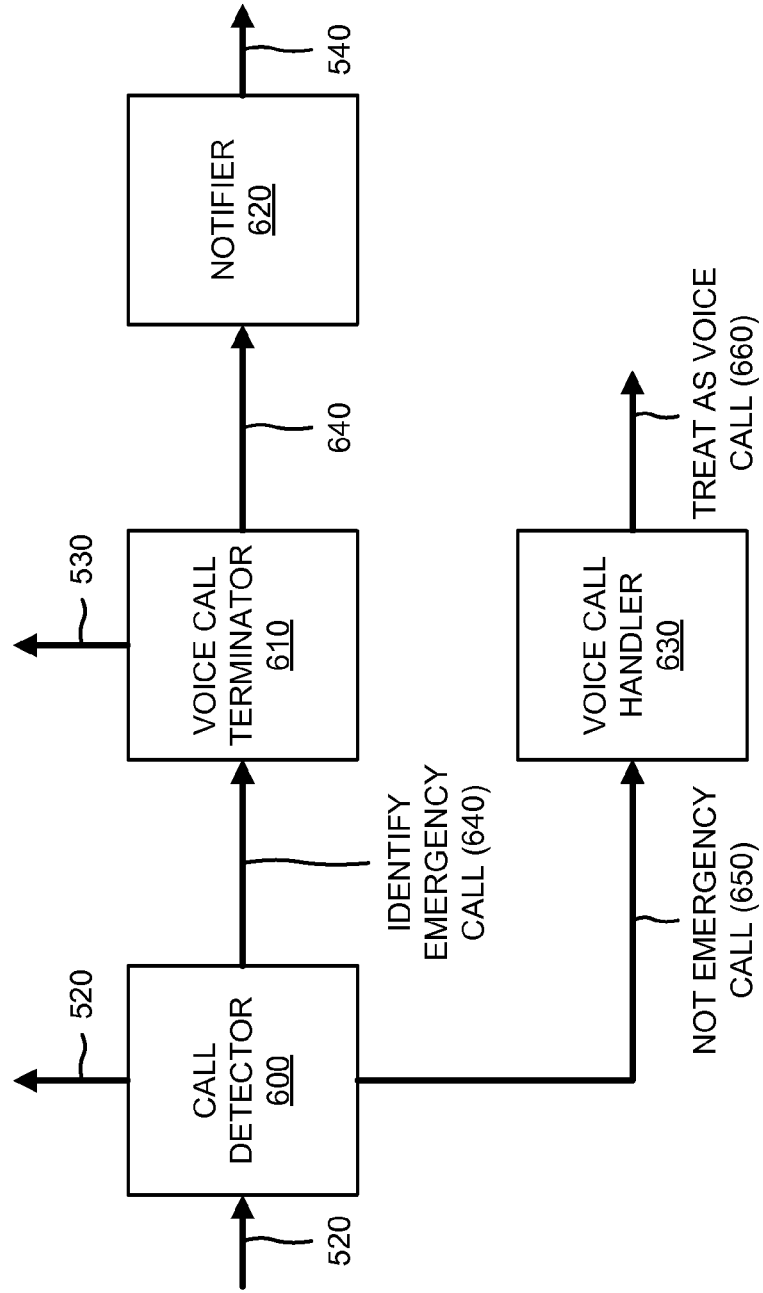
FIG. 6 is a diagram of example functional components of a gateway of the customer premises network depicted in FIG. 2.

FIG. 6 is a diagram of example functional components of gateway 280 of customer premises network 110. As illustrated, gateway 280 may include a call detector 600, a voice call terminator 610, a notifier 620, and a voice call handler 630. In one example implementation, the functions described in connection with FIG. 6 may be performed by one or more of the example components of device 400 (FIG. 4).

Call detector 600 may receive call 520 from user device 270-3, and may analyze the dialed information (e.g., the dialed digits) associated with call 520. Based on the analysis of the dialed information of call 520, call detector 600 may determine whether call 520 is an emergency call or a non-emergency call. If call detector 600 determines, based on the dialed information, that call 520 is an emergency call, call detector 600 may forward call 520 to LTE module 320 and may identify call 520 as an emergency call, as indicated by reference number 640. Call detector 600 may provide identification 640 to voice call terminator 610. If call detector 600 determines, based on the dialed information, that call 520 is not an emergency call, call detector 600 may identify call 520 as a non-emergency call, as indicated by reference number 650. Call detector 600 may provide identification 650 to voice call handler 630.

Voice call terminator 610 may receive identification 640 from call detector 600, and may terminate any other voice calls at customer premises network 110 except for emergency call 520, as indicated by reference number 530. Voice call terminator 610 may provide identification 640 to notifier 620.

Notifier 620 may receive identification 640 from voice call terminator 610, and may generate notification 540 based on identification 640. Notifier 620 may provide notification 540 to LTE module 320.

Voice call handler 630 may receive identification 650 from call detector 600, and may treat call 520 as a voice call, as indicated by reference number 660. In such a situation, there may be no knowledge of the emergency nature of call 520 until call 520 is received by base station 120.

Although FIG. 6 shows example functional components of gateway 280, in other implementations, gateway 280 may contain fewer functional components, different functional components, differently arranged functional components, or additional functional components than depicted in FIG. 6. Alternatively, or additionally, one or more functional components of gateway 280 may perform one or more other tasks described as being performed by one or more other functional components of gateway 280.

Figure 7:
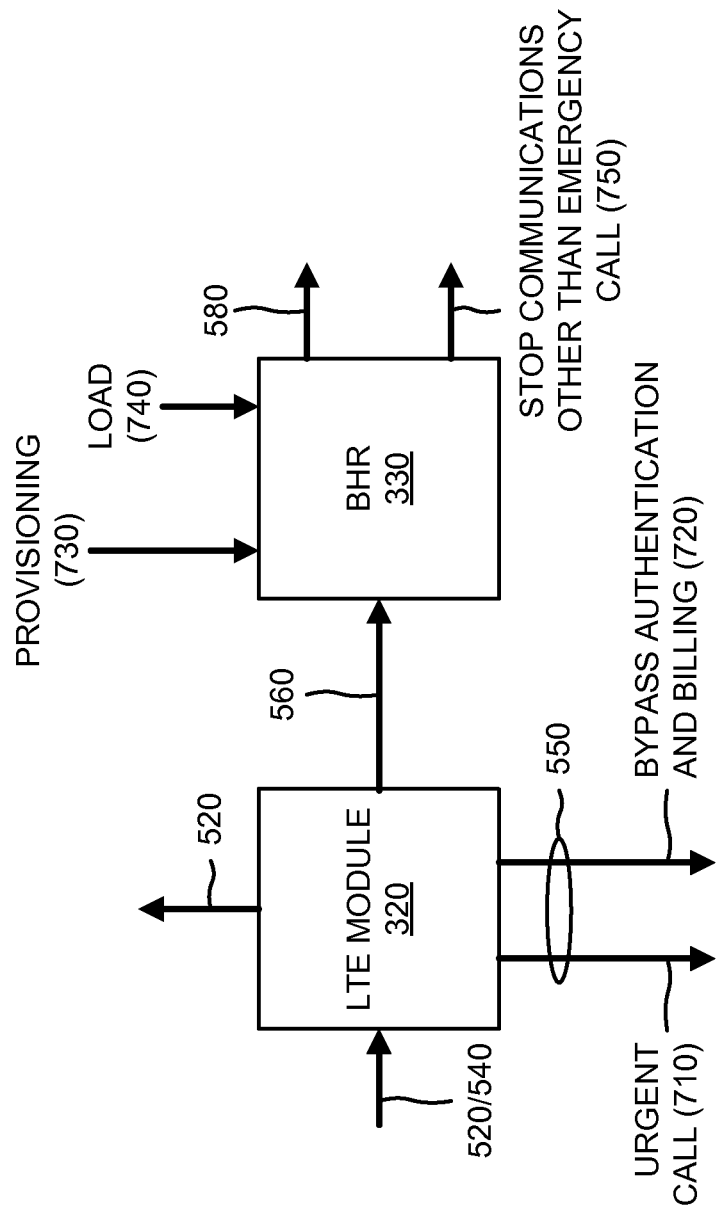
FIG. 7 is a diagram of example operations capable of being performed by a LTE module and a broadband home router of an outdoor broadband unit of FIG. 2.

FIG. 7 is a diagram of example operations 700 capable of being performed by LTE module 320 and BHR 330 of outdoor broadband unit 200. In one implementation, LTE module 320 and BHR 330 may include the features described above in connection with, for example, FIGS. 1-5.

As shown in FIG. 7, LTE module 320 may receive emergency call 520 and notification 540 from gateway 280, and may inform, based on notification 540, base station 120 (not shown) that emergency call 520 is an urgent call 710. LTE module 320 may instruct, based on notification 540, base station 120 to bypass authentication, billing, etc. associated with emergency call 520, as indicated by reference number 720. In one example, LTE module 320 may utilize the activated emergency bit 550 of emergency call 520 to inform base station 120 that emergency call 520 is an urgent call, and to instruct base station 120 to bypass authentication, billing, etc. associated with emergency call 520. LTE module 320 may provide emergency call 520 to base station 120, and may instruct base station 120 to forward emergency call 520 to an emergency call server.

As further shown in FIG. 7, LTE module 320 may provide, to BHR 330, notification 560 about the emergency nature of emergency call 520. BHR 330 may receive notification 560 from LTE module 320, and may receive provisioning information 730 and load information 740 from customer premises network 110. Provisioning information 730 may be provided by a service provider (e.g., service provider 140), and may include information that instructs BHR 330 to perform certain actions for VoIP calls, emergency calls, broadband traffic, video traffic, etc. Load information 740 may be provided by devices of customer premises network 110, and may include information about an amount of VoIP calls, broadband traffic, video traffic, etc. being communicated via customer premises network 110.

Based on notification 560, provisioning information 730, and/or load information 740, BHR 330 may cease all communications with customer premises network 110 other than a highest priority voice call (e.g., emergency call 520), as indicated by reference number 750. As further shown, based on notification 560, provisioning information 730, and/or load information 740, BHR 330 may put best effort traffic and/or low priority traffic on hold while emergency call 520 is handled, as indicated by reference number 580.

Although FIG. 7 shows example operations 700 capable of being performed by LTE module 320 and BHR 330 of outdoor broadband unit 200, in other implementations, LTE module 320 and BHR 330 may perform fewer operations, different operations, and/or additional operations than depicted and described in connection with FIG. 7.

Figure 8:
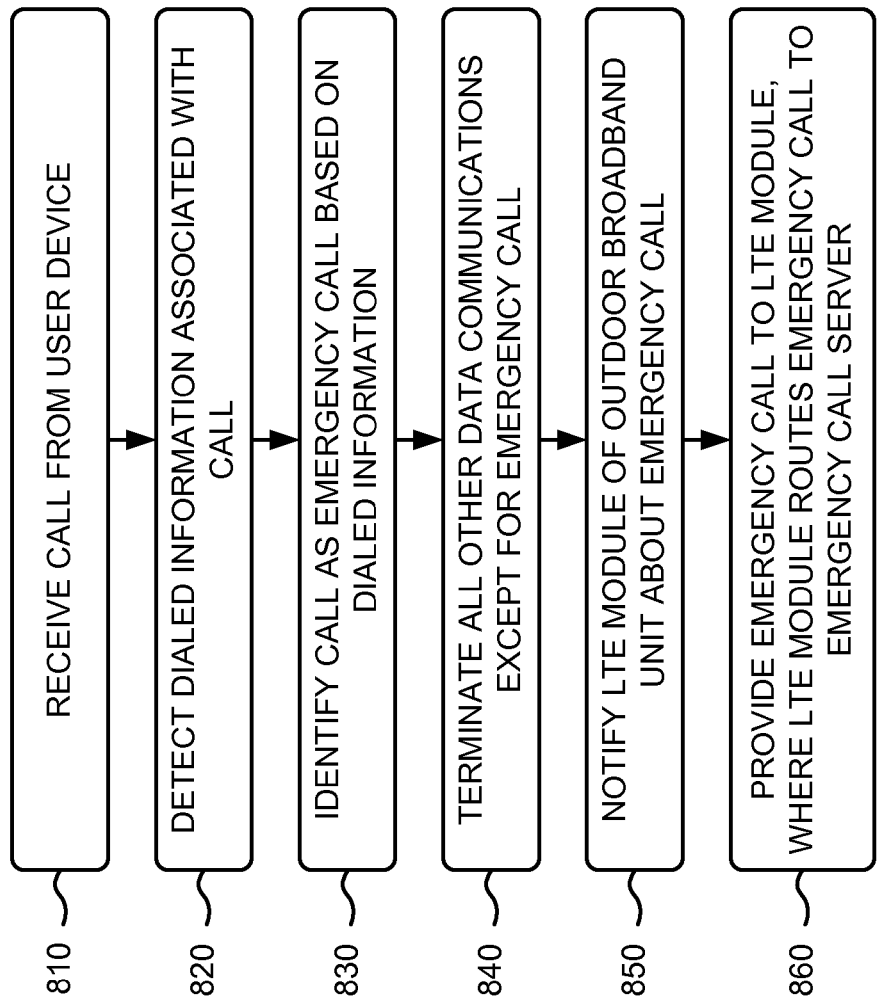
FIG. 8 is a flow chart of an example process for providing enhanced emergency services in fixed wireless customer premises equipment according to an implementation described herein.

FIG. 8 is a flow chart of an example process 800 for providing enhanced emergency services in fixed wireless customer premises equipment according to an implementation described herein. In one implementation, process 800 may be performed by gateway 280. In another implementation, some or all of process 800 may be performed by another device or group of devices, including or excluding gateway 280.

As shown in FIG. 8, process 800 may include receiving a call from a user device (block 810), and detecting dialed information associated with the call (block 820). For example, in implementations described above in connection with FIG. 5, a user may utilize user device 270-3 to dial digits for an emergency call, as indicated by reference number 510. User device 270-3 may receive the dialed digits, may generate emergency call 520 based on the dialed digits, and may provide emergency call 520 to gateway 280. Gateway 280 may receive emergency call 520 from user device 270-3, and may detect dialed information (e.g., the dialed digits) associated with emergency call 520.

As further shown in FIG. 8, process 800 may include identifying the call as an emergency call based on the dialed information (block 830), and terminating all other data communications, including other calls, except for the emergency call (block 840). For example, in implementations described above in connection with FIG. 5, based on the dialed digits of emergency call 520, gateway 280 may identify emergency call 520 as an emergency call and may terminate any other data communications, including voice calls, at customer premises network 110 except for emergency call 520, as indicated by reference number 530.

Returning to FIG. 8, process 800 may include notifying a LTE module of an outdoor broadband unit about the emergency call (block 850), and providing the emergency call to the LTE module, where the LTE module routes the emergency call to an emergency call server (block 860). For example, in implementations described above in connection with FIG. 5, since emergency call 520 originated in customer premises network 110, gateway 280 may provide, to LTE module 320, notification 540 about emergency call 520, and may provide emergency call 520 to LTE module 320. LTE module 320 may receive emergency call 520 and notification 540 from gateway 280, and may activate a notification bit (e.g., an emergency bit 550) of emergency call 520 based on notification 540. LTE module 320 may provide emergency call 520 and emergency bit 550 to a radio network (e.g., to base station 120). Based on emergency bit 550, base station 120 may route emergency call 520 to an emergency call server, via MWG 515, and the emergency call server may route the emergency call to a PSAP.

Figure 9:
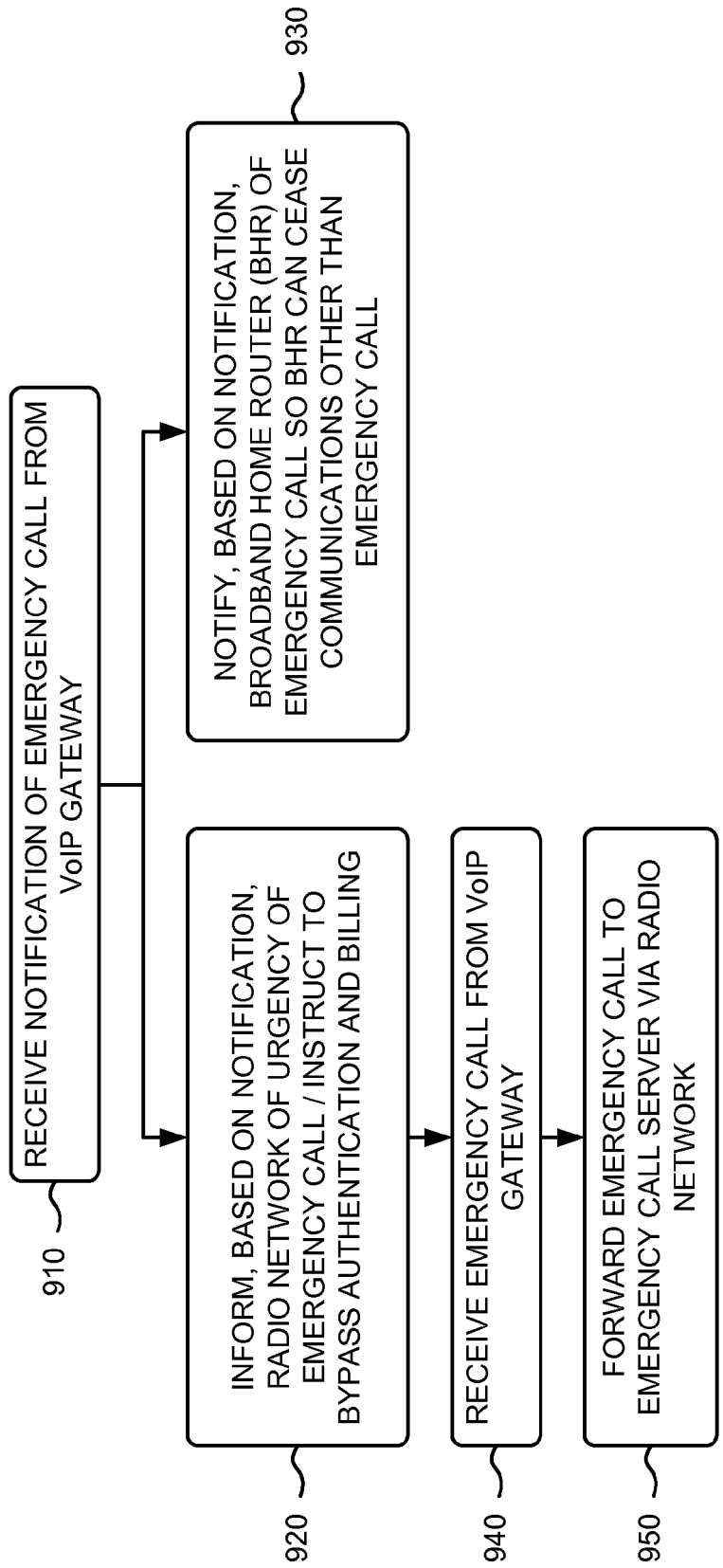
FIG. 9 is a flow chart of another example process for providing enhanced emergency services in fixed wireless customer premises equipment according to an implementation described herein.

FIG. 9 is a flow chart of another example process 900 for providing enhanced emergency services in fixed wireless customer premises equipment according to an implementation described herein. In one implementation, process 900 may be performed by LTE module 320 of outdoor broadband unit 200. In another implementation, some or all of process 900 may be performed by another device or group of devices, including or excluding LTE module 320.

As shown in FIG. 9, process 900 may include receiving a notification of an emergency call from a VoIP gateway (block 910), and informing, based on the notification, a radio network of the urgency of the emergency call and instructing the radio network to bypass authentication and billing for the emergency call (block 920). For example, in implementations described above in connection with FIG. 5, LTE module 320 may receive notification 540 from gateway 280, and may activate a notification bit (e.g., emergency bit 550) of emergency call 520 based on notification 540. LTE module 320 may provide emergency call 520 and emergency bit 550 to a radio network (e.g., to base station 120). Emergency bit 550 may inform base station 120 about the urgent or emergency nature of emergency call 520, may instruct base station 120 to bypass authentication, billing, etc. associated with emergency call 520, and may instruct base station 120 to forward emergency call 520 to an emergency call server.

As further shown in FIG. 9, process 900 may include notifying, based on the notification, a BHR about the emergency call so that the BHR can cease communications other than the emergency call (block 930). For example, in implementations described above in connection with FIG. 5, LTE module 320 may provide, to BHR 330, notification 560 about the emergency nature of emergency call 520. In one example, LTE module 320 may provide notification 560 to BHR 330 prior to or at the same time that LTE module 320 activates emergency bit 550. BHR 330 may receive notification 560 and may receive broadband and/or video traffic 570 from devices in customer premises network 110. Based on notification 560, static and/or dynamic provisioning, and/or load, BHR 330 may cease all communications with customer premises network 110 other than a highest priority voice call (e.g., emergency call 520). For example, BHR 330 may stop transmitting or receiving broadband and/or video traffic 570.

Returning to FIG. 9, process 900 may include receiving the emergency call from the VoIP gateway (block 940), and forwarding the emergency call to an emergency call server via the radio network (block 950). For example, in implementations described above in connection with FIG. 5, LTE module 320 may receive emergency call 520 from gateway 280, and may provide emergency call 520 to a radio network (e.g., to base station 120). Emergency bit 550 may instruct base station 120 to forward emergency call 520 to an emergency call server. Based on emergency bit 550, base station 120 may route emergency call 520 to the emergency call server, and the emergency call server may route the emergency call to a PSAP.

Systems and/or methods described herein may provide enhanced emergency services in fixed wireless customer premises equipment that includes combined gateway equipment and a VoIP gateway. The combined gateway equipment may include satellite and RF antennas that are installed at a customer premises. The RF antenna may be provided in an outdoor broadband unit that includes a LTE module capable of communicating with a wireless network. The outdoor broadband unit may also include a BHR capable of communicating with a customer premises network.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a gateway device provided in a customer premises, a call from a user device;
   detecting, by the gateway device, dialed information associated with the call;
   identifying, by the gateway device, the call as an emergency call based on the dialed information;
   terminating, by the gateway device, all other calls communicated by the gateway device except for the emergency call; and
   providing, by the gateway device, the emergency call and a notification about the emergency call to an outdoor broadband unit located at the customer premises, wherein providing the notification about the emergency call comprises:
      notifying a Long Term Evolution (LTE) module, provided in the outdoor broadband unit, about the emergency call.

2. The method of claim 1, further comprising:
   providing the emergency call to the LTE module, where the LTE module is to route the emergency call to an emergency call server.

3. The method of claim 1, where the user device is provided in the customer premises.

4. The method of claim 1, where the gateway device includes a voice over Internet protocol (VoIP) gateway device.

5. A gateway device provided in a customer premises, the gateway device comprising:
   a memory to store a plurality of instructions; and
   a processor to execute instructions in the memory to:
      receive a call from a user device,
      detect dialed information associated with the call,
      determine that the call is an emergency call based on the dialed information,
      terminate all other calls, associated with the customer premises and provided to or received by the gateway device, except for the emergency call,
      notify an outdoor broadband unit about the emergency call, where the outdoor broadband unit is located at the customer premises, wherein, when notifying the outdoor broadband unit about the emergency call, the processor further executes instructions in the memory to:
         notify a Long Term Evolution (LTE) module, provided in the outdoor broadband unit, about the emergency call, and
      provide the emergency call to the outdoor broadband unit.

6. The gateway device of claim 5, where the processor further executes instructions in the memory to:
   provide the emergency call to the LTE module, where the LTE module is to route to the emergency call to an emergency call server.

7. The gateway device of claim 5, where the user device is one of a plurality of user devices provided in the customer premises.

8. The gateway device of claim 5, where the gateway device includes a voice over Internet protocol (VoIP) gateway device that employs one or more short-range wireless communication protocols.

9. A method, comprising:
   receiving, by a Long Term Evolution (LTE) module provided in an outdoor broadband unit located at a customer premises, a notification of an emergency call received by a gateway device, wherein the outdoor broadband unit and the gateway device are provided in a customer premises network of the customer premises;
   receiving, by the outdoor broadband unit, the emergency call;
   ceasing, by the outdoor broadband unit and based on the notification, all communications associated with the customer premises network, other than the emergency call;
   informing, by the outdoor broadband unit, a radio network about an urgency of the emergency call; and
   instructing, by the outdoor broadband unit, the radio network to bypass authentication or billing associated with the emergency call.

10. The method of claim 9, further comprising:
    receiving the emergency call from the gateway device; and
    forwarding the emergency call to an emergency call server via the radio network.

11. The method of claim 9, where ceasing all communications associated with the customer premises network further comprises:
    placing on hold best effort traffic and low priority traffic associated with the customer premises network.

12. The method of claim 9, further comprising:
    receiving provisioning information associated with the customer premises network;
    receiving load information associated with the customer premises network; and
    ceasing all communications associated with the customer premises network, other than the emergency call, based on the provisioning information and the load information.

13. The method of claim 9, further comprising:
    setting an emergency bit associated with the emergency call, where the emergency bit informs the radio network about the urgency of the emergency call and instructs the radio network to bypass authentication or billing associated with the emergency call.

14. An outdoor broadband unit located at a customer premises network, the outdoor broadband unit comprising:
    a Long Term Evolution (LTE) module to:
       receive a first notification of an emergency call received by a gateway device provided in the customer premises network,
       provide, based on the first notification, a second notification of the emergency call to a broadband home router (BHR) of the outdoor broadband unit,
       inform a radio network about an urgency of the emergency call, and
       instruct the radio network to bypass authentication or billing associated with the emergency call; and
    wherein the BHR is configured to:
       cease, based on the second notification, all communications associated with the customer premises network, other than the emergency call.

15. The outdoor broadband unit of claim 14, where the LTE module is further to:
   receive the emergency call from the gateway device, and
   forward the emergency call to an emergency call server via the radio network.

16. The outdoor broadband unit of claim 14, where the BHR is further to:
   place on hold best effort traffic and low priority traffic associated with the customer premises network.

17. The outdoor broadband unit of claim 14, where the BHR is further to:
   receive provisioning information associated with the customer premises network,
   receive load information associated with the customer premises network, and
   cease all communications associated with the customer premises network, other than the emergency call, based on the provisioning information and the load information.

18. The outdoor broadband unit of claim 14, where the LTE module is further to:
   set an emergency bit associated with the emergency call, where the emergency bit informs the radio network about the urgency of the emergency call and instructs the radio network to bypass authentication or billing associated with the emergency call.

* * * * *